United States Patent
Menges

(10) Patent No.: US 8,134,250 B1
(45) Date of Patent: Mar. 13, 2012

(54) WIND GENERATOR SYSTEM SUITABLE FOR BOTH SMALL AND BIG WIND APPLICATIONS

(76) Inventor: Pamela A. Menges, Cincinnati, OH (US)

(*) Notice: Subject to any disclaimer, the term of this patent is extended or adjusted under 35 U.S.C. 154(b) by 478 days.

(21) Appl. No.: 12/319,939

(22) Filed: Jan. 14, 2009

Related U.S. Application Data

(60) Provisional application No. 61/011,015, filed on Jan. 14, 2008.

(51) Int. Cl.
F03D 9/00 (2006.01)
(52) U.S. Cl. .......................... 290/55; 290/44
(58) Field of Classification Search .................. 290/55, 290/44
See application file for complete search history.

(56) References Cited

U.S. PATENT DOCUMENTS

| | | | | |
|---|---|---|---|---|
| 1,460,114 A | * | 6/1923 | Shelton | 415/4.2 |
| 4,031,405 A | * | 6/1977 | Asperger | 290/55 |
| 4,057,270 A | * | 11/1977 | Lebost | 290/54 |
| 4,084,918 A | * | 4/1978 | Pavlecka | 290/55 |
| 4,242,628 A | | 12/1980 | Mohan et al. | |
| 5,572,816 A | | 11/1996 | Anderson, Jr. et al. | |
| 6,242,818 B1 | | 6/2001 | Smedley | |
| 6,465,902 B1 | | 10/2002 | Beauchamp et al. | |
| 6,724,097 B1 | | 4/2004 | Wobben | |
| 6,952,058 B2 | | 10/2005 | McCoin | |
| 7,045,702 B2 | | 5/2006 | Kashyap | |
| 2002/0084655 A1 | * | 7/2002 | Lof et al. | 290/44 |
| 2004/0232703 A1 | * | 11/2004 | Michael | 290/44 |
| 2006/0108809 A1 | * | 5/2006 | Scalzi | 290/55 |
| 2006/0232076 A1 | * | 10/2006 | Platt | 290/55 |

* cited by examiner

*Primary Examiner* — Quyen Leung
*Assistant Examiner* — Michael Andrews
(74) *Attorney, Agent, or Firm* — Mark F. Smith; Smith Brandenburg Ltd

(57) ABSTRACT

The present invention is a new and novel wind generator system particularly suitable for both small and big wind applications that harnesses low velocity wind effectively. In a preferred embodiment of the invention, the wind generator system comprises a drive shaft; a plurality of blades attached to the drive shaft and extending radially outwardly therefrom; a generator assembly coupled to the drive shaft and effective for generating electrical power; and a housing having an inner chamber for receiving the plurality of blades and a wind directional apparatus coupled to a wind shield for reducing aerodynamic resistance on said blades.

26 Claims, 8 Drawing Sheets

WIND GENERATOR SYSTEM SUITABLE FOR BOTH SMALL AND BIG WIND APPLICATIONS

CROSS-REFERENCE TO RELATED APPLICATION

The present invention relates to U.S. Provisional Patent Application Ser. No. 61/011,015 filed Jan. 14, 2008 for a distributed wind-powered communications.

TECHNICAL FIELD

The present invention is directed to power generation and, more particularly, to a new and improved wind generator system effective for generating electric power.

BACKGROUND OF THE INVENTION

In recent years the need for alternative sources of electrical energy has grown significantly as a result of increased and uncertainty in oil prices, growing environmental concerns, and the lack of sufficient alternative energy supplies. Accordingly, wind generator systems have gained support as an alternate energy source. Wind generators have been shown to provide a safe and clean source of electric power. Systems, such as large or big wind horizontal wind generators, have been developed having large blades (often more that 18 feet in length) mounted on high towers that can produce more than kilowatts (kW) of power with wind speeds of 20 knots. Such systems are typically used in combination with other wind generators, such as along coastal areas for providing electrical power directly to power grids. Such systems have also been used in rural areas, such as farms, for providing supplemental power or reducing electrical costs.

Small wind generators mounted on smaller towers have also been developed for use such as for residential application and have been used as remote or distributed power sources. Such systems are often connected to the main electric service to the home thereby allowing sufficient powering of the home and for sending excess power generated by the wind generator back to the power grid. Typically, theses small wind generators rotate at speeds that vary with wind speed and have a plurality of blades that drive a rotor coupled to a gearbox that operates to increase the rotation speed of a generator for producing electric power.

In order to reduce maintenance and increase efficiency, systems have been developed having relatively large synchronous ring generators that permit the rotor to be directly coupled to the generator without the need of a gearbox. Unfortunately, while such systems have reduced maintenance costs and have increased the efficiency of the systems, wind generator systems continue to suffer from relatively significant maintenance costs. Further, forces being exerted to the systems due to wind increase in proportion to the cube of wind speed. Accordingly, high wind speeds often encountered by horizontal wind generator systems, even if only occasional or momentary, can damage system components. This is particularly true for wind generators having relatively large blades such as typically required for small wind generators that depend on the relatively large blades to harvest lower-energy winds. Thus, small horizontal wind generator systems are typically designed having means for preventing system damage due to such high speed winds. Such means include blade pitching, airfoil spoilers, blade tip breaks, and the like. Means such as braking means or means that act upon the entire blade apparatus rather than on individual blades have also been developed. Unfortunately, all such means significantly add to the complexity and expense of the wind generator systems and significantly add to their maintenance down time and costs. In addition, systems having such means typically require routine maintenance which significantly increases their operating costs. This is particularly true when parts or components must be repaired or replaced which often requires significant rebuild or major dismantling of the system to replace a component. Further, during operation, such means often result in significant power drops or the cessation of power generation during such high wind conditions.

Another problem associated with horizontal wind generators is that they are often acoustically noisy and are undesirable for many residential and wind farm applications.

Accordingly, due to the complexity of many wind generators used in small wind or distributed power the need for a simple modular and easy to maintain generator is significant in not just reducing cost to the consumer but in the cost of manufacture and maintenance.

Consequently, a need exists for a wind generating system that has reduced cyclic cost, increased reliability and improved maintenance needs and costs, that is acoustically and aesthetically acceptable for residential operation as well as industrial and wind farm operations, and which is relatively inexpensive to manufacture and install.

SUMMARY OF THE INVENTION

The present invention is a new and novel wind generator system particularly suitable for both small and big wind applications and is not susceptible to damage from very high-wind conditions. In a preferred embodiment of the invention, the wind generator system comprises a drive shaft; a plurality of blades attached to the drive shaft and extending radially outwardly therefrom; a generator assembly coupled to the drive shaft and effective for generating electrical power; and a housing having an inner chamber for receiving the plurality of blades and a wind shield that operates to significantly reduce aerodynamic drag on the blades and adapts the performance of the system to wind speed and wind direction.

In a preferred embodiment of the invention the wind shield is coupled to a wind directional apparatus.

In a preferred embodiment of the invention the wind shield rotates with the wind directional apparatus.

In a preferred embodiment of the invention the wind shield reduces aerodynamic drag on advancing blades and provides no increase in aerodynamic drag on retreating blades.

In another preferred embodiment of the invention the wind generator system further comprises sensing means for monitoring the electrical power output of the wind generator system.

In another preferred embodiment of the invention the wind generator system further comprises sensing means for monitoring the operational efficiency of the wind generator system.

In another preferred embodiment of the invention the wind generator system further comprises communication and control means coupled to the sensing means and whereby the communication and control means can communicate with an outside monitoring system.

In another preferred embodiment the communication and control means of one wind generator system can communicate with the communication and control means of another wind generator system.

In another preferred embodiment of the invention the wind generator system further comprises mounting structures for equipment.

In another preferred embodiment of the invention the wind generator system further comprises a communication system for providing wireless communications to remote areas or during emergency conditions.

In another preferred embodiment of the invention the communication system is a radio activated communication system.

In another preferred embodiment of the invention the wind generator further comprises an upper frame disk and a lower frame disk forming an inner chamber and a porous tarp extending therebetween and operates to prevent articles from entering into the inner chamber.

Another preferred embodiment of the invention is a wind generator system comprising at least two rotors mounted to a drive shaft; each rotor having a plurality of blades attached thereto and extending radially outwardly from said rotor; a generator assembly coupled to the drive shaft and effective for generating electrical power; and a housing having an inner chamber for receiving each rotor and a plurality of blades; a wind directional apparatus that operates to detect the direction of wind; and a wind shield that blocks wind from advancing blades.

These and other features, aspects, and advantages of the present invention will become better understood with regard to the following description, appended claims, and accompanying drawings.

BRIEF DESCRIPTION OF THE DRAWINGS

To provide a more complete understanding of the present invention and further features and advantages thereof, reference is now made to the following description taken in conjunction with the accompanying drawings, in which:

FIG. 7 is a schematic illustration of another embodiment of the wind generator system having a housing further comprising stands, rack mounting structures for equipment, and the like.

DETAILED DESCRIPTION OF THE INVENTION

Figure 1:
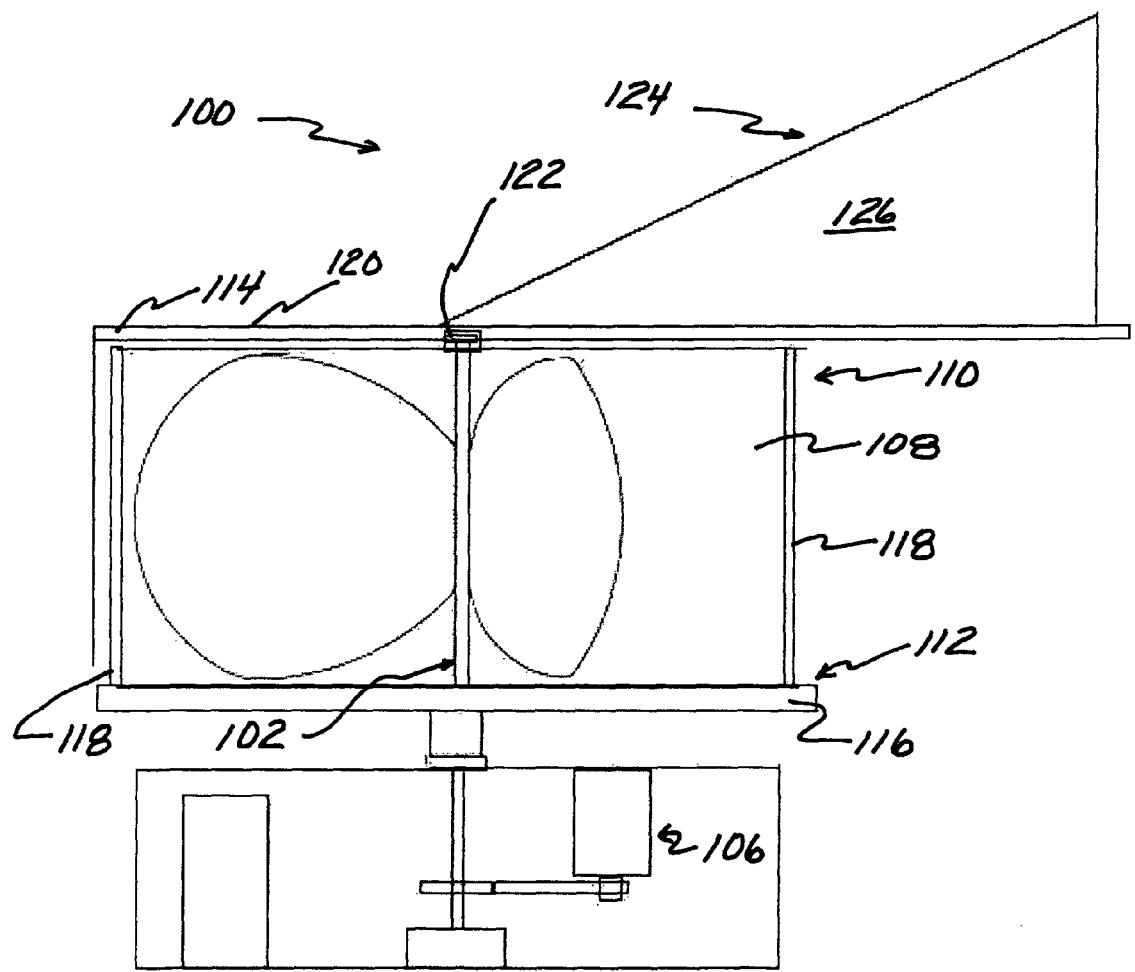
FIG. 1 is a side schematic illustration of the wind generator system of the subject invention showing the wind directional apparatus connected to the wind shield and various components, wherein the wind shields extends downwardly towards the lower frame disk but not contacting the lower frame disk.

The present invention relates to an adaptive performance, modular vertical wind generator system. In describing the preferred embodiments of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose. As used herein, the terms "downward" or "downwardly" means the direction towards the ground and the terms "upward" or "upwardly" means the direction away from the ground. The term "advancing" means moving in a direction substantially opposite of the wind direction and the term "retreating" means moving in a direction substantially in the same direction as the wind direction.

Figure 2:
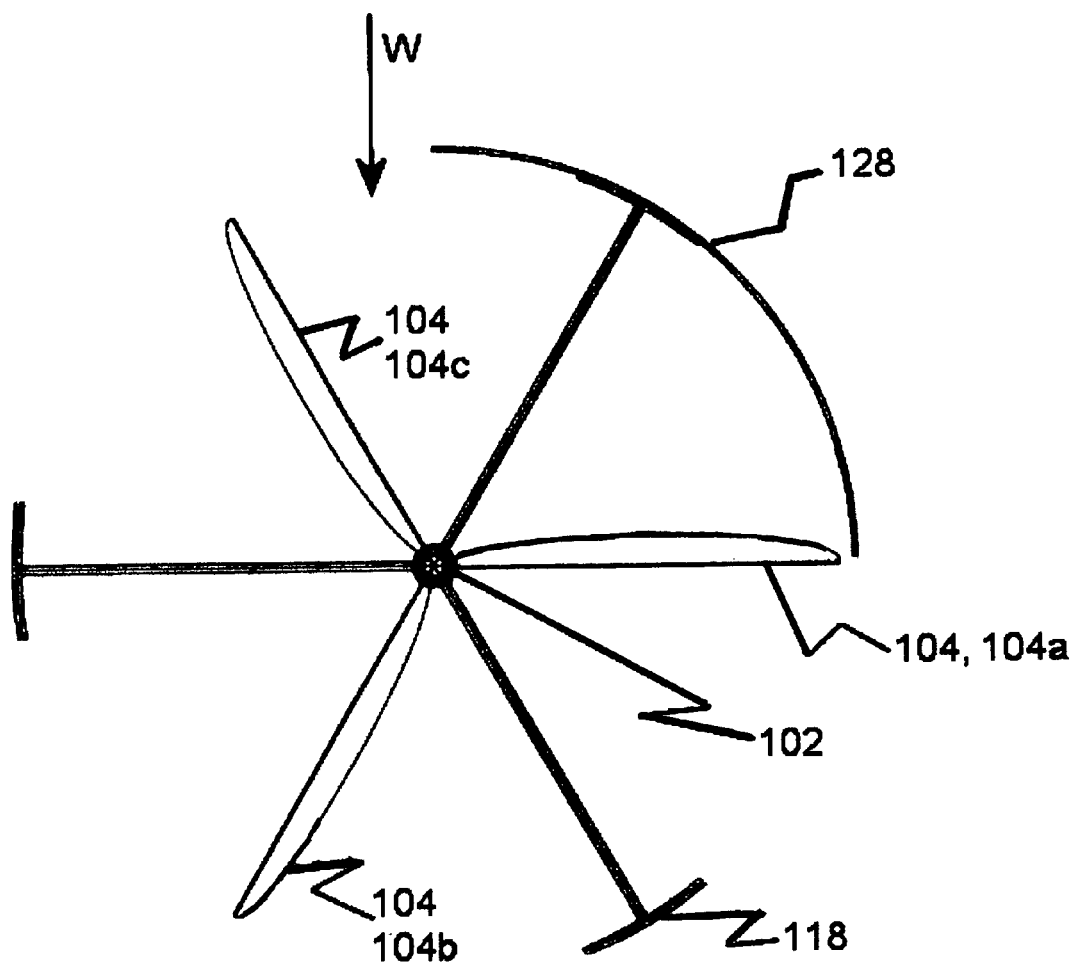
FIG. 2 is a top schematic illustration of the wind generator system of FIG. 1 with the wind directional apparatus and upper and lower frame disks removed for clarity, the illustration showing blades mounted to a drive shaft and the wind shield positioned such that it reduces aerodynamic drag on advancing blades and enclosed within a housing.

Referring to FIGS. 1 and 2, a preferred embodiment of the wind generator system, generally referred to as 100, is shown comprising a drive shaft 102 and a plurality of equally spaced blades 104 (two or more) attached to and extending radially outwardly from the drive shaft 102. In a preferred embodiment, as shown, there are three blades 104 mounted such that they are spaced at an angle $\alpha$ of 120°. The drive shaft 102 is operationally coupled to a generator assembly 106 which operates to generate electrical power when actuated by rotation of the drive shaft 102. It should be understood that as used herein the term "generator" includes alternators. In a preferred embodiment as shown, the drive shaft 102 and blades 104 are enclosed within an inner chamber 108 of a housing 110. The housing 110 comprises a frame 112 having an upper frame disk 114, a lower frame disk 116, and a plurality of vertical supports 118 for supporting the upper frame disk 114 and the lower frame disk 116 in spatial alignment. Concentrically positioned to the upper surface 120 of the upper frame disk 114 is a race and bearing assembly 122 for rotatably mounting a conventional wind directional apparatus 124 that operates by freely rotating in response to wind pressure on its vertically extending surfaces 126. Mechanically coupled to the wind directional apparatus 124 is a wind shield 128 that preferably is positioned within and rides along a circular track 130 positioned along the outer periphery 132 of the lower frame disk 116.

Figure 3:
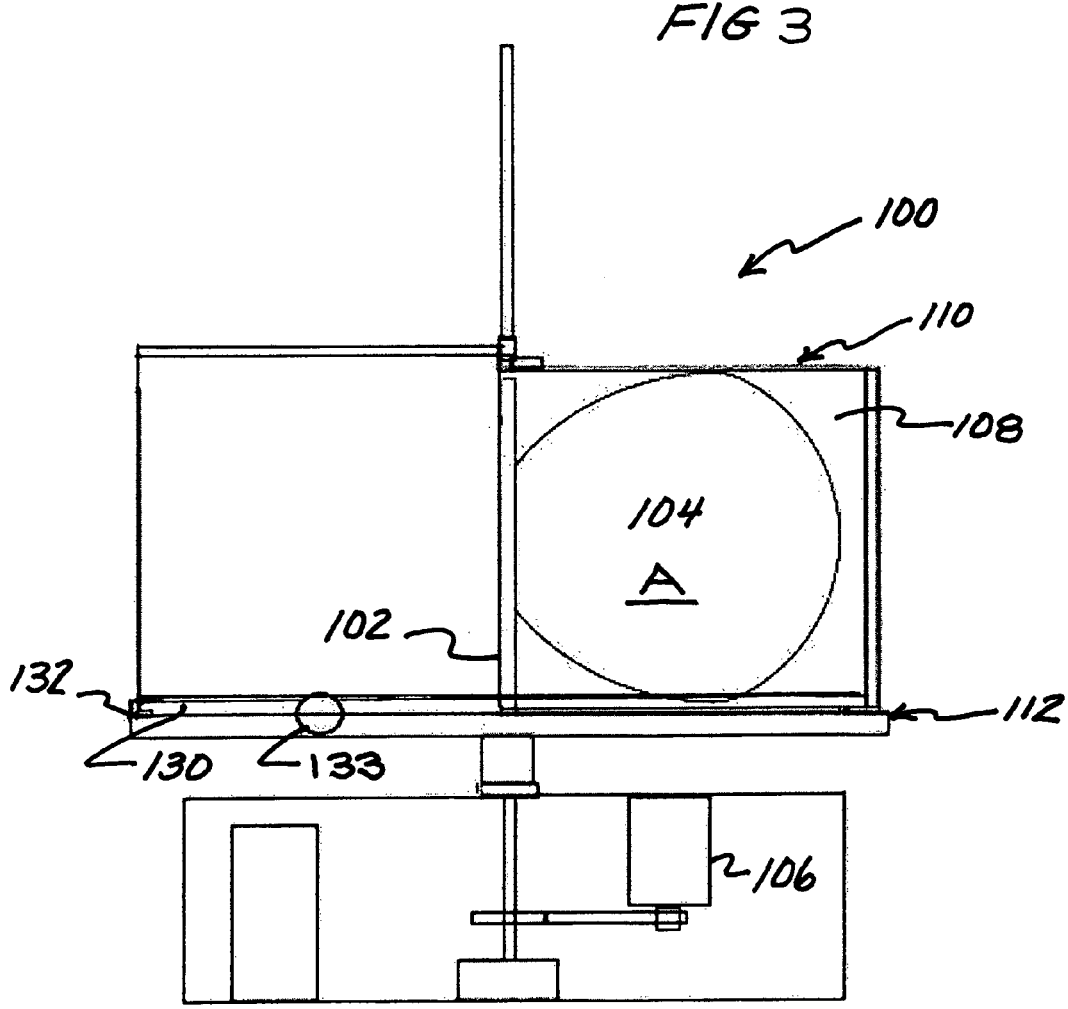
FIG. 3 is a side schematic illustration of another preferred embodiment of the wind generator system showing the wind shield extending downwardly towards the lower frame disk and positioned within and rides along the outer periphery of the lower frame disk.

In a preferred embodiment of the invention, as shown in FIG. 3, the wind shield 128 extends vertically downwardly towards the periphery 132 of the lower frame disk 116 but does not contact the lower frame disk 116.

In operation, as shown in FIG. 2, the wind shield 128 rotates around the circumference of the upper frame disk 114 with rotation of the wind directional apparatus 124 and effectively reduces aerodynamic drag on the advancing blades 104a and 104b by providing a barrier or shield that blocks wind flow W that produces resistance to blade rotation while providing no resistance or blockage to wind flow W impacting the retreating blade 104c. Preferably, the wind shield 128 is positioned between the upper rotor disk 114 and the lower rotor disk 116 covering approximately a quarter of the circumference of the housing 110 (approximately 90° arc). It has been found that rotational resistance due to wind can be reduced by about 40% to about 70% depending on the number of blades, materials used in the construction of the wind generator, and the measured wind speed.

Figure 4:
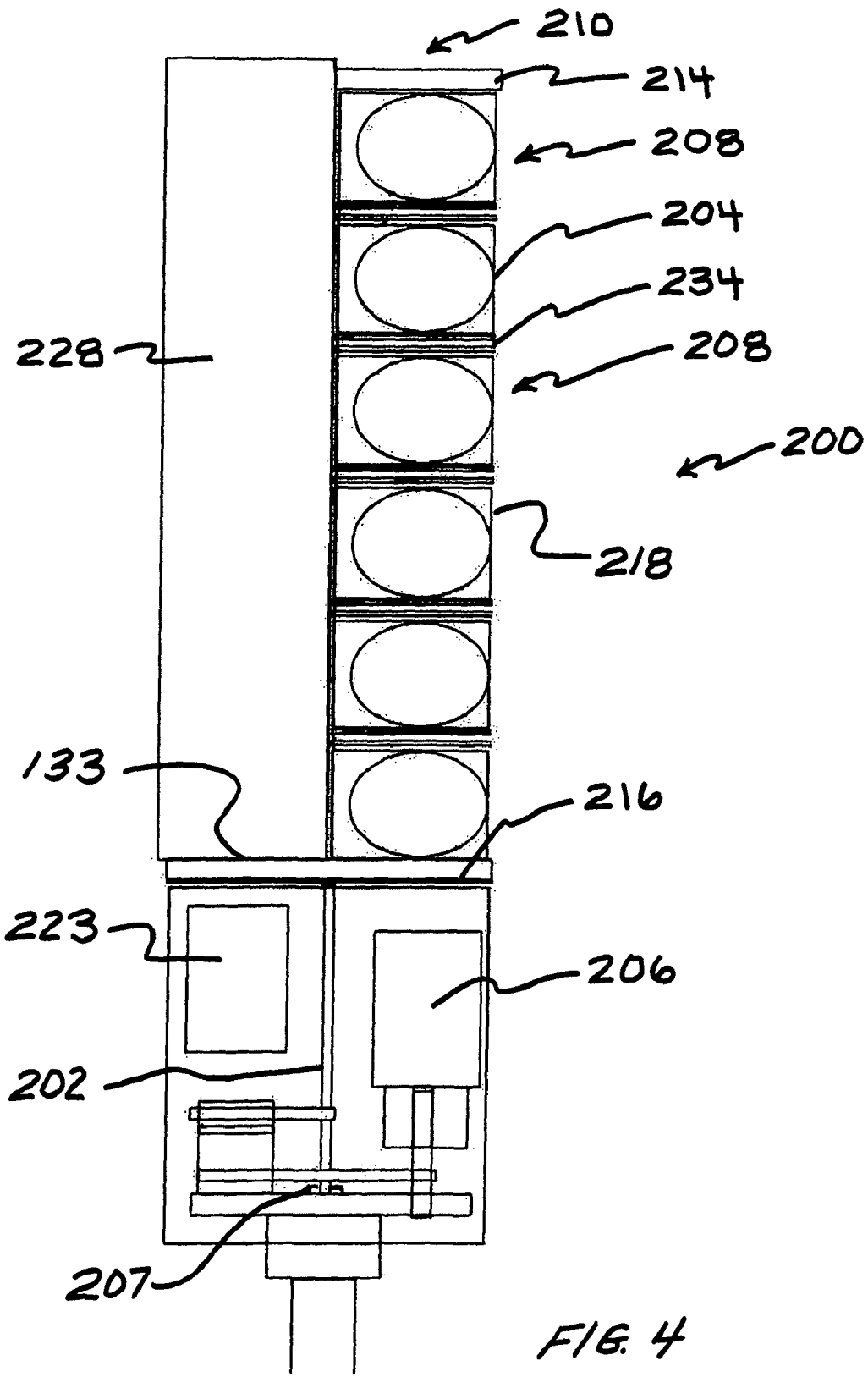
FIG. 4 is schematic side view illustration of another preferred embodiment of the wind generator system of the subject invention showing a plurality of aligned or stacked stages of blades mounted to a central drive shaft.
Figure 7:
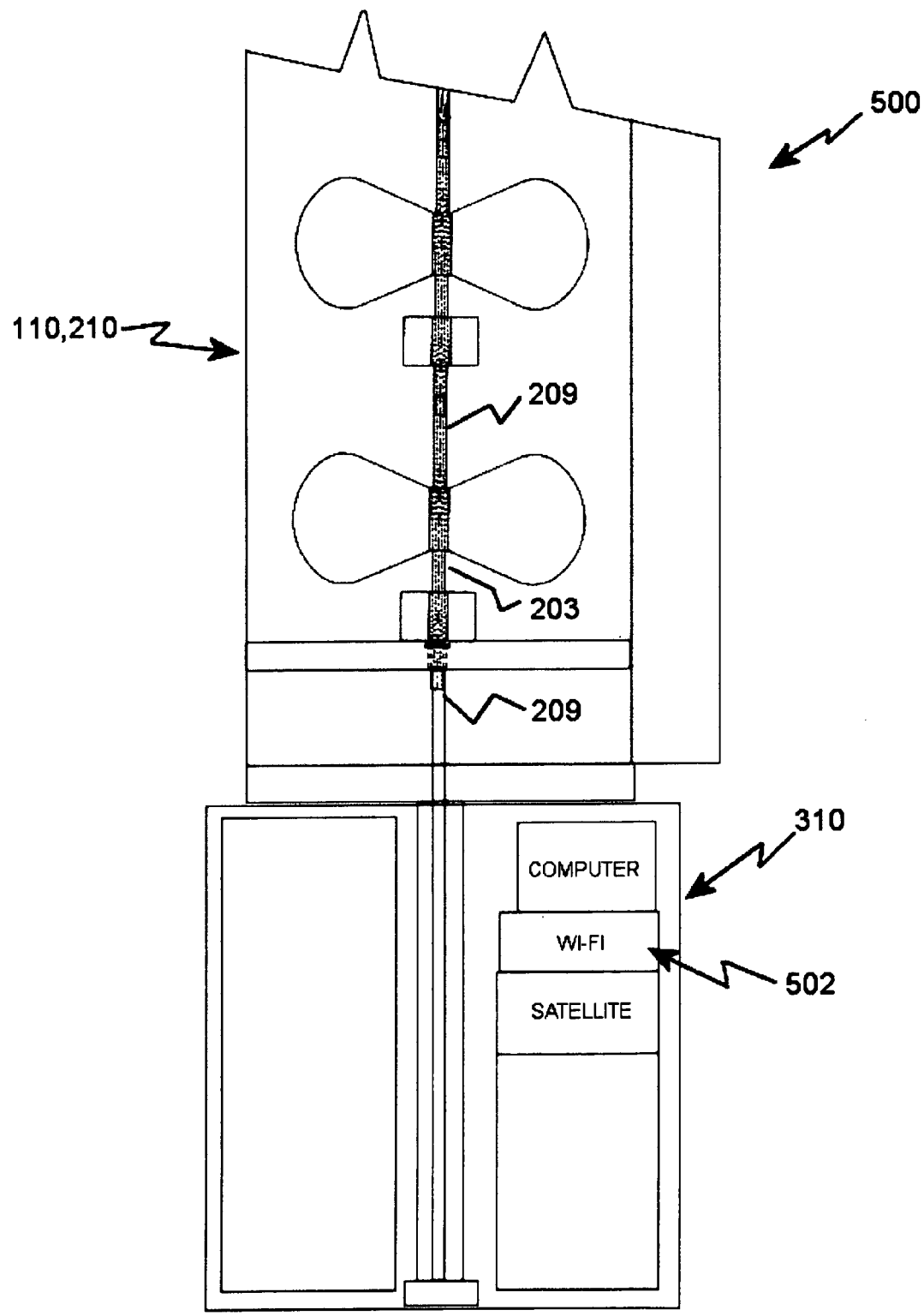

Referring to FIG. 4, another preferred embodiment of the invention is shown whereby the wind generator system 200 comprises a single drive shaft 202 or a series of shafts mounted together such as by couplings 209, as shown in FIG. 7, and a one or more stages 208 of blades 204, each stage having one or more blades 204 attached to and extend radially outwardly from the drive shaft 202. It should be understood that each stage 208 can be arranged in a horizontal or vertical arrangement. The drive shaft 202 is operationally coupled to a generator assembly 206 or a plurality of generator assemblies 206 (as shown) which operate to generate electrical power when actuated by rotation of the drive shaft 202. Preferably, the drive shaft 202 is formed from a light aircraft grade rolled or extruded aluminum and is tubular having an inner channel 203 (FIG. 7) that provides a chase for allowing a power bus, control cables and the like to travel to the various stages, controls, and actuators and other similar electronic components 310 (FIG. 7). The drive shaft 202 is supported by a housing 210 preferably having an upper frame disk 214, a lower frame disk 216, a plurality of vertically extending support rods 218, a plurality of inner support disks 234, and one or more bearing assemblies 207 for rotatably supporting the drive shaft 202. It should be understood that the individual stages can be modular and assembled together by use of a rotating coupling placed in series of the individual stages, as shown. It should also be understood that the individual generators can be mounted in series to the drive shaft or the drive shaft can be coupled to a single generator.

Concentrically positioned to the upper surface 220 of the upper frame disk 214 is a race and bearing assembly 222 for rotatably mounting a conventional wind directional apparatus 224 that operates by freely rotating in response to wind pressure on its vertically extending surfaces 226. Mechanically coupled to the wind directional apparatus 224 is a wind shield 228 that preferably is positioned within and rides along a circular track 230 positioned along the outer edge 232 of the lower frame disk 216.

Referring to FIG. 1, a preferred embodiment of the blades 104 is shown wherein each blade 104 has a relatively large surface area A effective for harvesting lower-energy (low wind speed) wind being directed to the blades 104.

Figure 5:
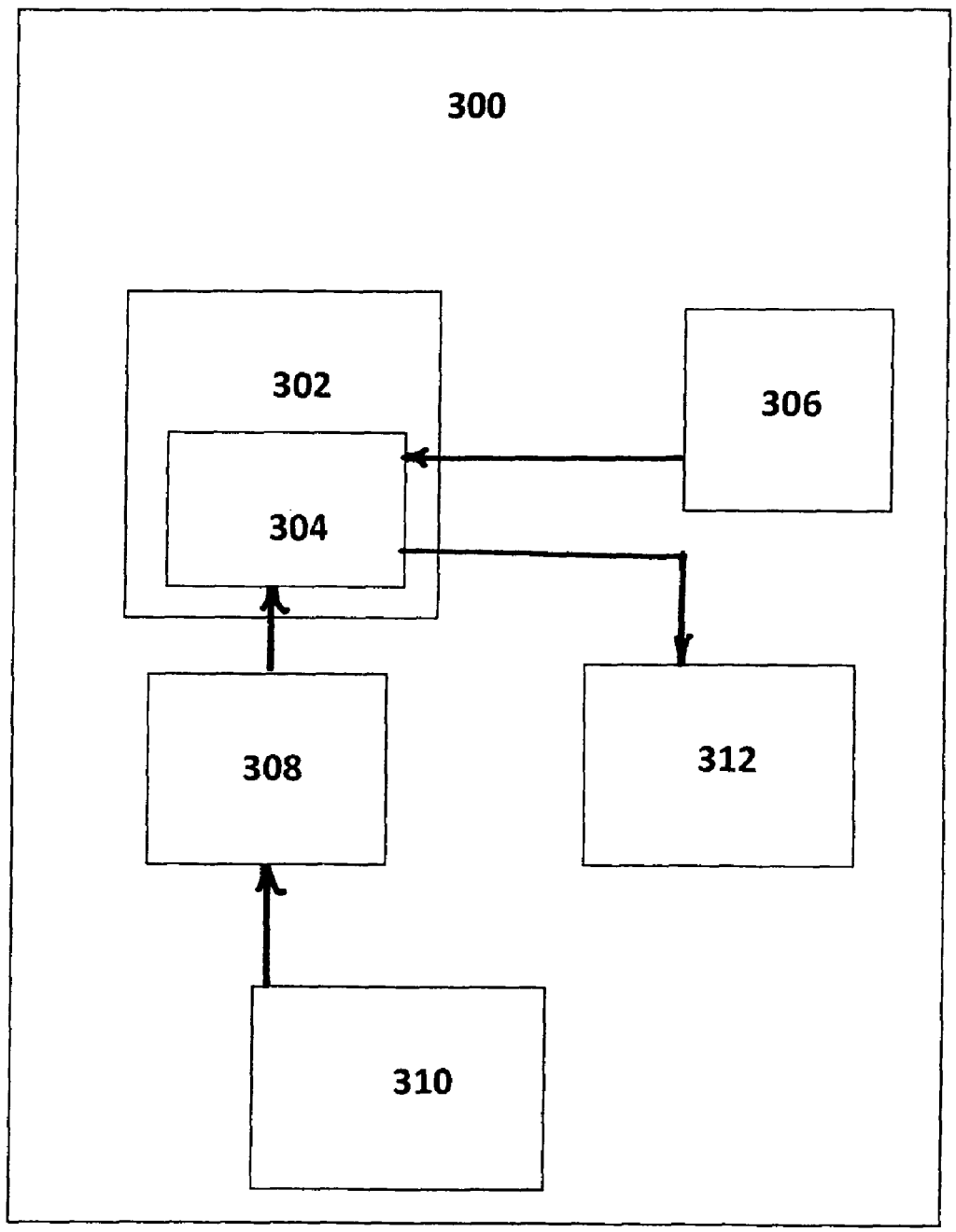
FIG. 5 is a schematic illustration showing a performance monitor for monitoring the performance and efficiency of the wind generator system.

In another preferred embodiment of the invention, as shown in FIG. 5, the wind generator system 300 as described above further comprises a performance monitor 302 for monitoring the performance and efficiency of the wind generator system 300 Preferably, the performance monitor 302 comprises a microprocessor 304 effective for receiving signals from a wind speed and direction sensor 306 as well as receiving signals from other component sensors 308 effective for transmitting information from the components 310 comprising the wind generator system 300. In a preferred embodiment, the performance monitor 302 operates to monitor the electrical power output of the wind generator system 300. It should now be understood that other sensors 308 can be utilized for providing signals to the microprocessor 304 that can be utilized by the microprocessor for determining the efficiency or performance of the various operational components 310 comprising the wind generator system 300 and transmitting the information to an output device 312 such as a monitor, computer, meter or the like.

In another preferred embodiment, the microprocessor 304 can operate to monitor the total power output of the wind generator system 300 to the rotational speed of the blades 104, 204 to determine the health and operation performance of the system. For an exemplanary illustration, if the power output being generated by the wind generator system is below the level typically generated for the particular wind speed, the system components can be evaluated to determine which particular component is not operating efficiently and the component can be replaced thereby bringing the system efficiency back to its typical level. It should be understood that additional conventional sensors can be incorporated into the wind generator system to monitor the operational efficiency of various components and monitored by the microprocessor. Further, it should now be understood that the microprocessor can be coupled to a conventional transmitter (such as a wireless radio transmitter, the Internet, or other communication system) for transmitting operational data to a remote monitoring device. In this way, individual systems can be monitored as well as for use in obtaining information for use in maintenance and in determining the need for performance enhancement modifications.

Figure 6:
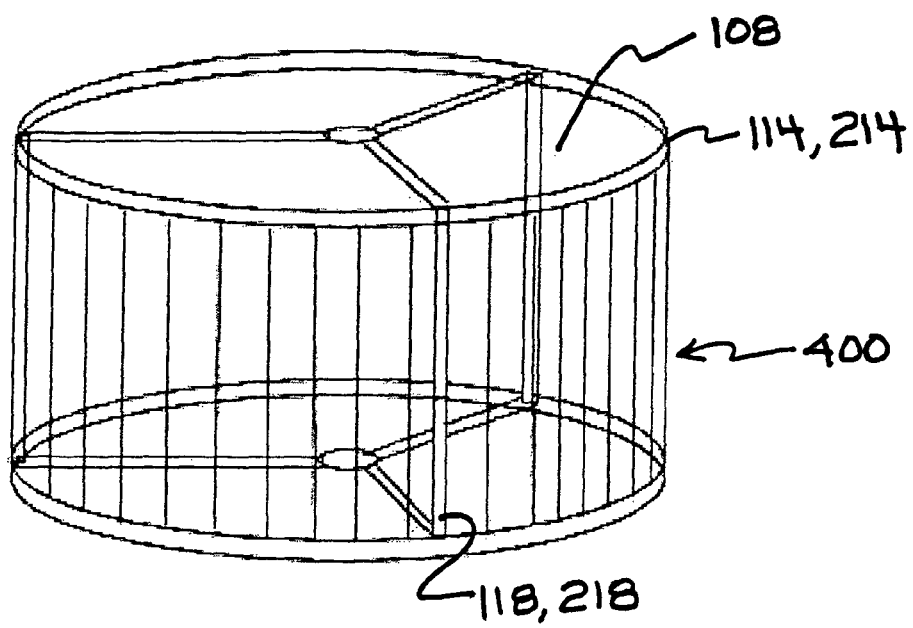
FIG. 6 is a schematic side view illustration showing another preferred embodiment of the wind generator system with the wind directional apparatus, wind shield and rotor, blades removed and showing the housing with a porous tarp positioned around the periphery of the housing.

Referring to FIG. 6, in another preferred embodiment of the invention is shown further comprising a porous tarp 400 extending vertically downwardly from the upper frame disk 114, 214 and supported by vertical support rods 118, 218. It should be understood that such a tarp 400 should not be so porous to allow birds and articles from entering into the inner chamber 108 and causing damage to one or more of the rotating blades but should be porous enough for minimizing wind resistance.

It should now be understood that the generator system of the present invention can be used to provide electric power for various applications. As an exemplanary illustration, such systems can be mounted to a permanent structure or be portable for emergency and/or remote location use. Further, as shown in FIG. 7, in a preferred embodiment of the wind generator system 500 as illustrated the housing 110, 210, includes a stand or a rack mounting structure 502 for supporting and housing various equipment, such as electrical equipment, battery systems, and the like.

Figure 8:
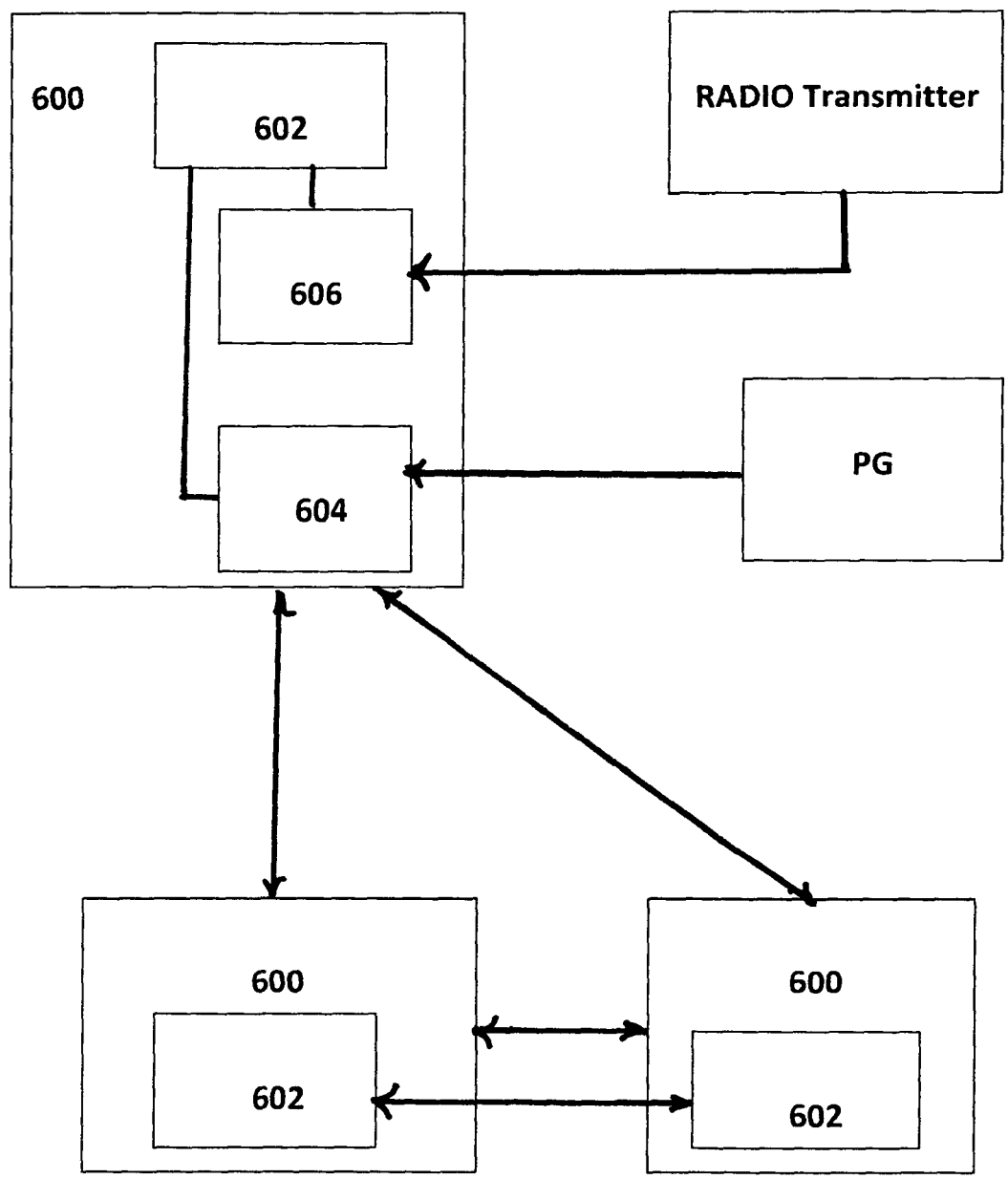
FIG. 8 is a schematic illustration showing the communication system of the subject invention.

In another preferred embodiment of the invention a plurality of wind generators can augment existing communications and power infrastructures by providing communications through multiple communications protocols as well as provide a delay tolerant network or a network that supports data transmission when there is insufficient or continuous network connectivity. Nearly 50% of the United States is without wireless or hard wired communications. Rural and remote communications is necessary during medical emergencies, natural disasters and for homeland security. The wind generators of the subject invention can provide significant power for communications as well as support a variety of communications technologies. In a preferred embodiment of the invention, as shown in FIG. 8, the wind generator system 600 each include a communication system 602 such that a plurality of wind generators can operate independently using their communication systems 602 to create a mesh network.

It should now be apparent that the communication systems 602 of a plurality of wind generators systems 600 can be connected through wireless and/or hard-wired systems. Further it should now be apparent that the wind generator systems can be used to create a distributed power networks. These networks may be used to augment the existing grid power system or can be used as back-up power to local users in case of a grid-based power outage. In a preferred embodiment, the communications systems 602 of the wind power generators 600 of the subject invention include a conventional switching means 604 that detects power interruption or power fluctuation within a power grid PG and operates to direct power being generated by the wind generators 600 into the power grid PG to prevent or reduce the likelihood of rolling or cascade failure in the power grid PG.

In another preferred embodiment of the invention the communication system 602 of the wind power generator of the subject invention further includes conventional radio activating emergency voice, data, remote sensing, and telecommunications devices 606, such as devices to transmit over 911 and emergency broadcasting systems. Such telecommunications devices 606 can be activated by radio signals that allow communications in the event primary communications are inactivated such as by storms or other national emergencies. Such devices 606 can also be used to boost signals and/or relay transmission signals in the event that primary systems, such as communication towers, are inactivated.

Accordingly, it should now be apparent that various equipment and devices can be incorporated into the wind generator system of the subject invention and can include various devises for communication, such as devices supporting voice-over-Internet-protocol, cellular and other wireless protocols and communications systems. Such communication systems, being powered by electrical energy being generated by the wind generator system can be used as part of a larger wireless communications system or can be used for providing communications during emergency conditions, such as when the primary communication system is damaged such as for an example when a communications tower has been damaged or has lost power. It should also be apparent to those skilled in the art that such communications systems, being powered by electrical energy generated by the wind generator can be used to provide wireless communications in remote locations or for temporary communications such as in remote locations.

It should now be understood to those skilled in the art that the wind generator system of the present application is easily constructed in modular form thereby reducing the time and cost needed to make repairs to the system. For the use of performance monitors and sensors reduces maintenance requirements and increases efficiency. Further, the wind generator system of the present application reduces the likelihood of damage resulting from high wind speeds without the need of relatively complex and expensive blade pitching devices, airfoil spoilers, blade tip breaks, braking means, and the like.

It should also now be understood to those skilled in the art that the wind generator system of the present application can be used in a variety of applications and can be easily placed at locations having natural wind currents, such as between building structures or walls that operate as wind tunnels.

Although the foregoing invention has been described in some detail for purposes of clarity of understandings, it will be apparent that certain changes and modifications may be practiced within the scope of any claims. It should now be apparent that the various embodiments presented can be easily modified while keeping within the scope and spirit of the subject invention. Accordingly, it should be understood that the present disclosure is to be considered as exemplary of the principals of the invention and is not intended to limit the invention to the embodiments and the specific examples illustrated and the invention is not to be limited to the details given herein, but may be modified within the scope and equivalents of the descriptions and examples contained herein.

I claim:

1. A wind generator system comprising:
   a rotor mounted to a drive shaft;
   one or more blades attached to said rotor and extending radially outwardly from said rotor;
   a generator assembly coupled to said drive shaft and effective for generating electrical power; and
   a stationary housing having a frame comprising an upper frame disk and a lower frame disk forming an inner chamber for receiving said rotor and said more than one rotating blades, wherein at least one blade is a retreating blade and at least one blade is an advancing blade;
   a freely rotating wind directional apparatus that operates to detect the direction of the wind and is mechanically coupled to a wind shield rotatably attached to said frame such that it rotates with respect to said upper frame disk and said lower frame disk in response to the direction of the wind and operates to provide a barrier to block wind from providing resistance to blade rotation.

2. The wind generator system of claim 1 wherein said wind shield is coupled to said wind directional apparatus.

3. The wind generator system of claim 1 wherein said wind shield rotates with said wind directional apparatus.

4. The wind generator system of claim 1 wherein said wind shield reduces aerodynamic drag on said advancing blade and provides no increase in aerodynamic drag on said retreating blade.

5. The wind generator system of claim 1 further comprising sensing means for monitoring the electrical power output of the wind generator system.

6. The wind generator system of claim 1 further comprising sensing means for monitoring the operational efficiency of the wind generator system.

7. The wind generator system of claim 5 further comprising communication and control means coupled to said sensing means and whereby said communication and control means can communicate with an outside monitoring system.

8. The wind generator system of claim 7 whereby said communication and control means of one wind generator system can communicate with said communication and control means of another wind generator system.

9. The wind generator system of claim 1 wherein said wind directional apparatus comprises a plurality of rotatable slats.

10. The wind generator system of claim 1 further comprising mounting structures for equipment.

11. The wind generator system of claim 1 further comprising at least one emergency telecommunications device that can be activated for providing radio and/or telephone communication for primary communication systems.

12. The wind generator system of claim 11 wherein said at least one emergency telecommunication device is a radio activated device that operates to boost signals and/or relay transmission signals from primary communication systems.

13. The wind generator of claim 1 further comprising a porous tarp extending between said upper frame disk and said lower frame disk and operates to prevent articles from entering into said inner chamber.

14. A wind generator system comprising:
   at least two rotors mounted to a drive shaft;
   each rotor having a plurality of blades attached thereto and extending radially outwardly from said rotor;
   a generator assembly coupled to said drive shaft and effective for generating electrical power; and
   a stationary housing having a frame comprising an upper frame disk and a lower frame disk forming an inner chamber for receiving each said rotor and said plurality of blades and a freely rotating wind directional apparatus that operates to detect the direction of wind and is mechanically coupled to a wind shield rotatably attached to said frame such that it rotates with respect to said upper frame disk and said lower frame disk in response to the direction of the wind and blocks wind from advancing blades.

15. The wind generator system of claim 14 wherein said wind shield is coupled to said wind directional apparatus.

16. The wind generator system of claim 14 wherein said wind shield rotates with said wind directional apparatus.

17. The wind generator system of claim 14 wherein said wind shield reduces aerodynamic drag on said advancing blade and provides no increase in aerodynamic drag on said retreating blade.

18. The wind generator system of claim 14 further comprising sensing means for monitoring the electrical power output of the wind generator system.

19. The wind generator system of claim 14 further comprising sensing means for monitoring the operational efficiency of the wind generator system.

20. The wind generator system of claim 18 further comprising communication and control means coupled to said sensing means and whereby said communication and control means can communicate with an outside monitoring system.

21. The wind generator system of claim 20 whereby said communication and control means of one wind generator system can communicate with said communication and control means of another wind generator system.

22. The wind generator system of claim 14 wherein said wind directional apparatus comprises a plurality of rotatable slats.

23. The wind generator system of claim 14 further comprising a mounting structure for equipment.

24. The wind generator system of claim 14 further comprising at least one emergency telecommunications device that can be activated for providing radio and/or telephone communication for primary communication systems.

25. The wind generator system of claim 24 wherein said at least one emergency telecommunication device is a radio activated device that operates to boost signals and/or relay transmission signals from primary communication systems.

26. The wind generator of claim 14 further comprising an upper frame disk and a lower frame disk forming an inner chamber and a porous tarp extending therebetween and operates to prevent articles from entering into the inner chamber.

* * * * *